(12) United States Patent
Stevens et al.

(10) Patent No.: US 8,918,294 B2
(45) Date of Patent: *Dec. 23, 2014

(54) MONITORING WATER CONSUMPTION

(75) Inventors: Mark B. Stevens, Austin, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 318 days.

This patent is subject to a terminal disclaimer.

(21) Appl. No.: 13/452,209

(22) Filed: Apr. 20, 2012

(65) Prior Publication Data

US 2013/0179096 A1 Jul. 11, 2013

Related U.S. Application Data

(63) Continuation of application No. 13/343,990, filed on Jan. 5, 2012.

(51) Int. Cl.
| | | |
|---|---|---|
| *G06F 19/00* | (2011.01) | |
| *G01F 23/296* | (2006.01) | |
| *E03B 7/00* | (2006.01) | |
| *G01M 3/24* | (2006.01) | |
| *G01F 1/66* | (2006.01) | |

(52) U.S. Cl.
CPC . *G01F 1/66* (2013.01); *E03B 7/003* (2013.01); *G01M 3/24* (2013.01)
USPC .............................. 702/48; 73/40.5 A; 702/51

(58) Field of Classification Search
CPC ........ G01F 15/0755; G01F 1/66; G01M 3/24; G01M 3/243; E03D 1/00; G01N 2291/02836; G01N 29/14; G01N 29/222; G01N 29/4418; G01N 29/46; G08B 21/0484; G08B 21/18; G08B 3/10; G08B 5/36; H04Q 9/00
USPC .......... 702/45, 48, 51, 54; 73/40.5 A, 40.5 R, 73/861.18; 137/10, 486; 340/605, 870.02; 700/282
See application file for complete search history.

(56) References Cited

U.S. PATENT DOCUMENTS

| | | | |
|---|---|---|---|
| 4,736,763 A | * | 4/1988 | Britton et al. .................. 137/10 |
| 5,040,409 A | * | 8/1991 | Kiewit ...................... 73/40.5 A |
| 6,063,632 A | | 5/2000 | Perkins |
| 6,526,807 B1 | | 3/2003 | Doumit et al. |
| 6,753,186 B2 | | 6/2004 | Moskoff |
| 7,218,237 B2 | | 5/2007 | Kates |

(Continued)

OTHER PUBLICATIONS

Fisher, "New Techniques for Leak Detection in Challenging Acoustic Environments," wateronline.com, Jun. 2008, 2 pages.

(Continued)

*Primary Examiner* — John H Le
(74) *Attorney, Agent, or Firm* — Yee & Associates, P.C.; Jeffrey S. LaBaw

(57) ABSTRACT

A method for monitoring water consumption. A set of locations in a fluid transport system in a structure is monitored for sounds generated by a fluid flowing at an endpoint of the fluid transport system. Current acoustic data is generated for the sounds detected from monitoring the set of locations. The current acoustic data is compared with historical acoustic data to form a difference. A determination is made as to whether the difference exceeds a threshold. An action is performed in response to determining that the difference exceeds the threshold.

14 Claims, 4 Drawing Sheets

(56) References Cited

U.S. PATENT DOCUMENTS

| | | |
|---|---|---|
| 7,742,883 B2 | 6/2010 | Dayton et al. |
| 7,774,149 B2 * | 8/2010 | Kim et al. .................. 702/51 |
| 8,359,877 B2 | 1/2013 | Kamen et al. |
| 8,489,342 B2 | 7/2013 | Dugger et al. |
| 2004/0128034 A1 | 7/2004 | Lenker et al. |
| 2008/0262755 A1 | 10/2008 | Dayton et al. |
| 2008/0283129 A1 | 11/2008 | Brown |
| 2009/0301173 A1 | 12/2009 | Lamberti et al. |
| 2011/0215945 A1 | 9/2011 | Peleg et al. |
| 2012/0026004 A1 | 2/2012 | Broniak et al. |
| 2013/0179095 A1 | 7/2013 | Stevens et al. |

OTHER PUBLICATIONS

Stevens et al., U.S. Appl. No. 13/343,990, filed Jan. 5, 2012, 29 pages.

Office Action, dated Sep. 12, 2014, regarding U.S. Appl. No. 13/343,990, 16 pages.

* cited by examiner

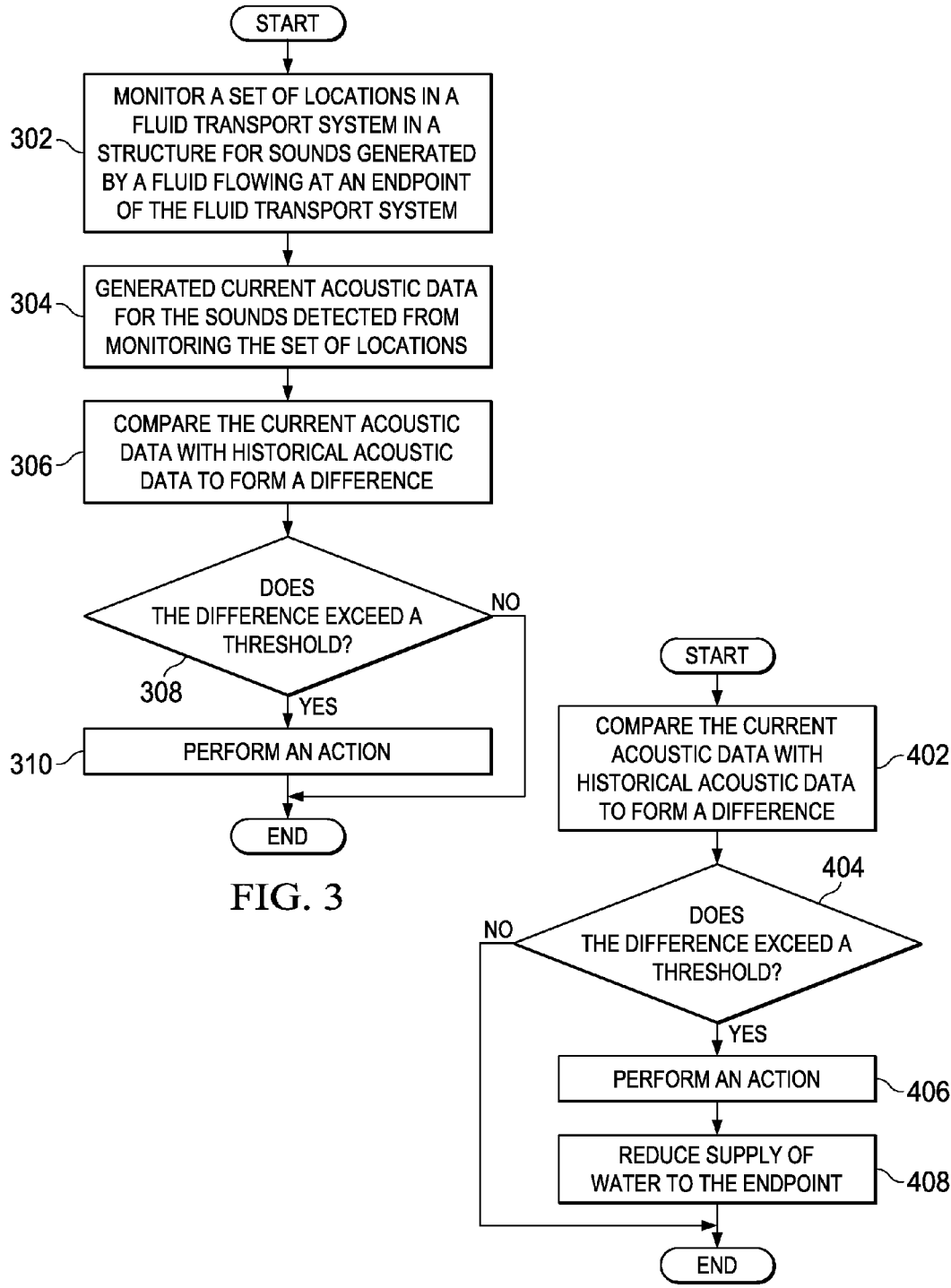

MONITORING WATER CONSUMPTION

This application is a continuation of application Ser. No. 13/343,990, filed Jan. 5, 2012, status pending.

BACKGROUND

1. Field

The present disclosure relates generally to monitoring water consumption and in particular to a method and system for monitoring a fluid transport system for sounds generated by a fluid flowing at an endpoint of the fluid transport system. Still more particularly, the present disclosure relates to a method and system for monitoring water consumption, wherein current acoustic data is compared with historical acoustic data.

2. Description of the Related Art

With an increasing population and expanding infrastructure, effective water management has become a high priority in today's environment. Due to the limited availability of water, organizations and individuals work to reduce excessive water use. Through effective water management policies, water use can be reduced. By reducing water use, cost savings may be achieved. Moreover, reduced water consumption has a positive impact on the environment because less waste water is produced.

The ability to effectively monitor water usage is an important part of water management. By identifying excessive water use, actions can be taken to reduce or eliminate the excessive water use. For example, flow meters can be placed on a main water line and other water lines throughout a building. Changes in water use patterns or unusual water flow may indicate excessive water use. However, it may be difficult and time-consuming to identify the reason for excessive water use. For example, it may take a considerable amount of time and effort to identify a leaking faucet in a bathroom on the top floor of a building as the source of excessive water use.

SUMMARY

The different illustrative embodiments provide a method for monitoring water consumption. A set of locations in a fluid transport system in a structure is monitored for sounds generated by a fluid flowing at an endpoint of the fluid transport system. Current acoustic data is generated for the sounds detected from monitoring the set of locations. The current acoustic data is compared with historical acoustic data to form a difference. A determination is made as to whether the difference exceeds a threshold. An action is performed in response to determining that the difference exceeds the threshold.

BRIEF DESCRIPTION OF THE SEVERAL VIEWS OF THE DRAWINGS

FIG. 3 is an illustration of a flowchart of a process for monitoring water consumption in accordance with an illustrative embodiment;

FIG. 4 is an illustration of a flowchart of a process for monitoring water consumption in accordance with an illustrative embodiment.

DETAILED DESCRIPTION

Figure 1:
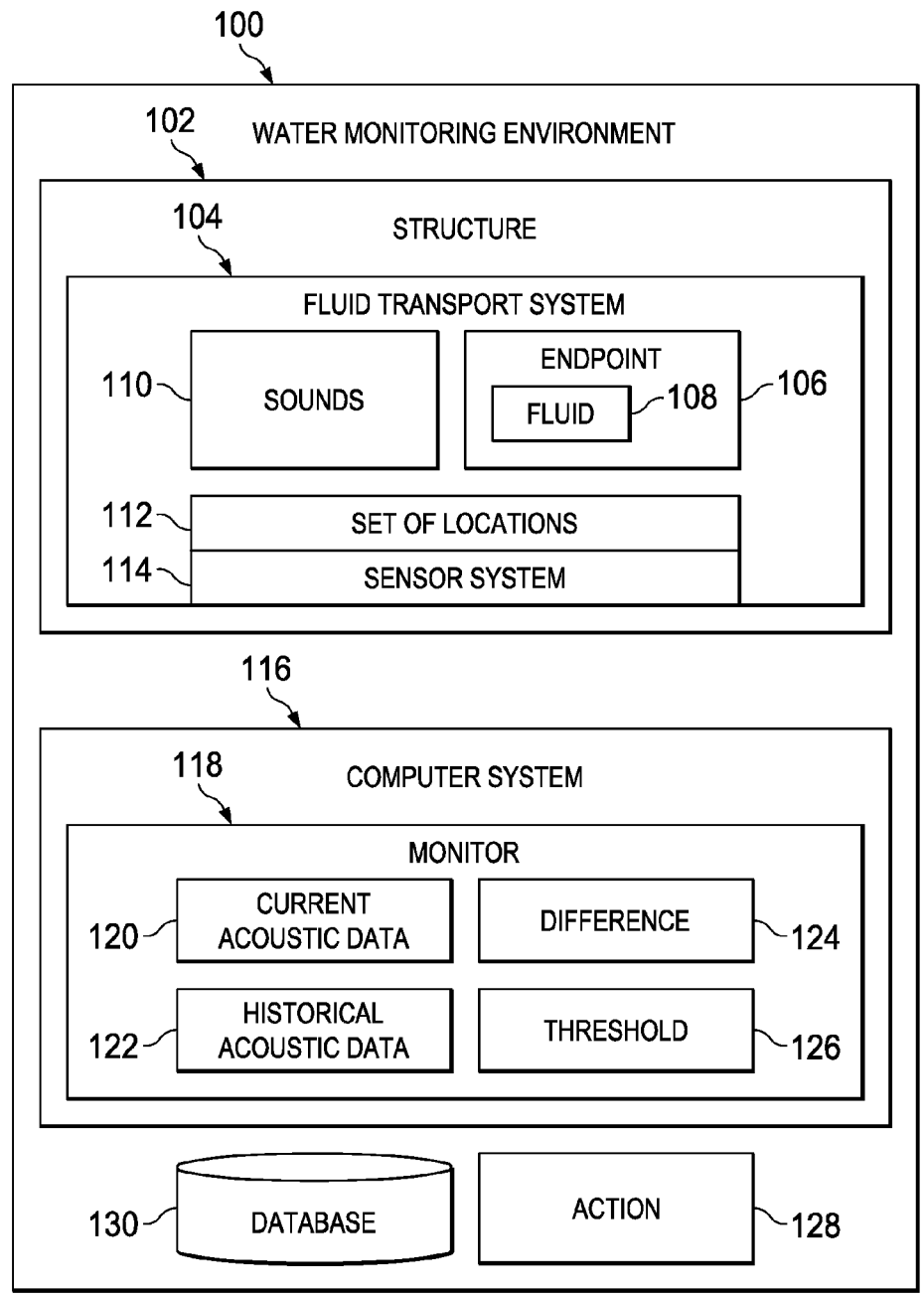
FIG. 1 is an illustration of a water monitoring environment in which illustrative embodiments may be implemented.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems) and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are processed on the computer or other programmable apparatus provide processes for implementing the functions/acts specified in the flowchart and/or block diagram block or blocks.

The different illustrative embodiments recognize and take into that account that effective water management has become a high priority in today's environment. The different illustrative embodiments recognize and take into account that organizations are looking for effective ways to reduce their impact on the environment. The different illustrative embodiments recognize and take into account that monitoring water consumption in a structure, such as a building, may be desirable.

Thus, the different illustrative embodiments provide method, apparatus, and computer program product for monitoring water consumption. A set of locations in a fluid transport system in a structure is monitored for sounds generated by a fluid flowing at an endpoint of the fluid transport system. Current acoustic data is generated for the sounds detected from monitoring the set of locations. The current acoustic data is compared with historical acoustic data to form a difference. A determination is made as to whether the difference exceeds a threshold. An action is performed in response to determining that the difference exceeds the threshold. As used herein, "set of" refers to "one or more." For example, a set of locations is one or more locations.

With reference to FIG. 1 water monitoring environment 100 is depicted in accordance with an illustrative embodiment. As depicted, water monitoring environment 100 is an example of components in which the illustrative embodiments may be implemented.

In the depicted example, structure 102 comprises a fluid transport system 104. Structure 102 can be a building, house, and any other structure suitable for containing a fluid transport system. Fluid transport system 104 can be a plumbing system, a set of pipes, a set of fluid lines for transporting fluid, and any other system suitable for transporting fluid.

In the depicted example, fluid transport system 104 comprises an endpoint 106. Endpoint 106 can be faucet, toilet, urinal, water fountain, and any other device suitable for containing fluid 108, affecting the flow of fluid 108, controlling the flow of fluid 108, and allowing fluid to flow through the device. Fluid 108 can be water and any other fluid suitable for flowing through fluid transport system 104. For example, fluid 108 can be water that is used for a plumbing system in a building or house.

In the depicted example, sounds 110 are generated by fluid 108 flowing at endpoint 106. Sounds 110 can also be generated by a fluid flowing towards or away from an endpoint.

In the illustrative examples, sounds 110 are monitored at set of locations 112 by sensor system 114. For example, sensor system 114 can be a microphone in contact with a portion of fluid transport system 104 or in a vicinity close enough to fluid transport system 104 to allow the microphone to monitor sounds 110 at set of locations 112. In some illustrative examples, a hydrophone, acoustical transducer, and any other device suitable for monitoring set of locations 112 may be used. Monitoring can be detecting sounds, recording sounds, detecting vibrations, recording vibrations, detecting an acoustic signature, recording an acoustic signature, and any other activity suitable for generating and collecting acoustic data.

In this illustrative example, computer system 116 comprises monitor 118, which receives current acoustic data 120 generated by monitoring sounds 110 at set of locations 112 by sensor system 114. For example, sensor system 114 may detect, generate, and collect acoustic data. Sensor system 114 may then send the acoustic data to monitor 118. Monitor 118 may collect and store the acoustic data as current acoustic data 120. In some illustrative examples, current acoustic data 120 may be used to form historical acoustic data 122.

Monitor 118 may be software running on computer system 116. In some illustrative examples, monitor 118 may be hardware. In the depicted example, computer system 116 is hardware that may comprise one or more computers, server computers, client computers, personal devices, or any other systems capable of running program code. Furthermore, computer system 116 communicates with set of locations 112 via a communications medium. Examples of a communications medium that may be used include, for example a network, wire and wireless transmission of information.

Historical acoustic data 122, like current acoustic data, may be detected, generated, and collected by sensor system 114. In the illustrative examples, historical acoustic data 122 is acoustic data generated by monitoring sounds at set of locations 112 at one or more time periods before monitoring sounds 110 for current acoustic data 120. Historical acoustic data 122 may be collected and stored in monitor 118. For example, historical acoustic data 122 can be data that indicates endpoint 106 is operating properly and is consuming an amount of fluid within a threshold value. In some illustrative examples, historical acoustic data 122 can be compared to current acoustic data 120 to determine if endpoint 106 is operating properly and is consuming an amount of fluid within a threshold value.

For example, current acoustic data 120 may comprise an acoustic signature of endpoint 106 generated at a current time period and historical acoustic data 122 may comprise an acoustic signature of endpoint 106 generated at a previous time period, wherein the previous time period occurs before the current time period.

In some illustrative embodiments, historical acoustic data is collected by monitoring sounds at a set of locations 112, wherein each location 112 is proximate to a portion of a fluid transport system 104 that is contained in a structure 102 comprising a specified building. Thus, historical acoustic data for these embodiments is specific to, or collected specifically in regard to, the specified building.

In some illustrative examples, current acoustic data 120 is compared with historical acoustic data 122 to form difference 124. Difference 124 can be one or more numerical values or any other value suitable for indicating one or more variations between current acoustic data 120 and historical acoustic data 122. Responsive to determining that difference 124 exceeds threshold 126, monitor 118 may perform action 128. Threshold 126 can be one or more numerical values or any other value suitable for comparing to difference 124. If difference 124 exceeds threshold 126, monitor 118 may reduce a supply of fluid, such as water, to endpoint 106.

In some illustrative examples, acoustic signatures are different for each endpoint because of physical differences of each endpoint, different distances between each endpoint and monitoring microphone, reflections, different numbers of branches fluid lines, differences in materials of each fluid line, and different diameters of each fluid line. In some illustrative examples, a digital signal processor or another type of signal processor can identify each signature as belonging to a particular endpoint.

In some illustrative examples, monitor 118 collects statistical data that corresponds to normal and typical operational behavior of each endpoint. For example, historical acoustic data 122 may be initialized by creating a catalog and glossary of acoustic signatures of each endpoint 106 for different levels of fluid flow and output of each endpoint 106. The signature of each endpoint 106 may also include an amount of time and duration of the acoustic signature. Thus, a setup phase may be used to initialize historical acoustic data 122 based upon normal and typical acoustic signatures of each endpoint 106. In some illustrative examples, the setup phase may be repeated in order to obtain more recent acoustic signatures in order to update historical acoustic data 122. Updating historical acoustic data 122 may occur at regular time intervals, such as every week, month, and year.

In some illustrative examples, if monitor 118 determines that an acoustic signature of a particular endpoint is continuing longer than normal and typical, then monitor 118 performs action 128, such as reporting and notifying of the condition. For example, an email, text message, audible alert, graphical indicator on a display, or any other form of notification for reporting the abnormal acoustic signature can be generated. Examples of conditions that can be detected through an abnormal acoustic signature are leaks, continuously running urinals and toilets, flush cycles of urinals and toilets that are abnormally long and faucets that have been left on. In some illustrative examples, action 128 is a corrective action that reduces, stops, and shuts off a flow of fluid to the endpoint. In some illustrative examples, valves, actuators, and any other devices suitable for reducing and stopping fluid flow may be used.

In some illustrative examples, an amplifier, analog to digital converter, and digital signal processing software, may be used with the microphone, hydrophone, or acoustic transducer to generate current acoustic data 120 and historical acoustic data 122. In some illustrative embodiments, current acoustic data 120 and historical acoustic data 122 are stored in database 130. Database 130 may store an acoustic signature of each endpoint and a corresponding identifier that identifies which endpoint belongs to each acoustic signature. In some illustrative embodiments, a setup procedure initializes database 130. For example, each endpoint in a structure, such as a building, can be operated in order to generate and store a corresponding acoustic signature for the endpoint. A time of occurrence of each acoustic signature and duration of each signature is recorded in database 130. Then, current acoustic data 120 can be compared to the stored historical acoustic data 122 for a particular endpoint. For example, if the duration of the current acoustic data 120 indicates an amount of time for a flushing operation is outside of a threshold 126, an alert may be generated.

Figure 2:
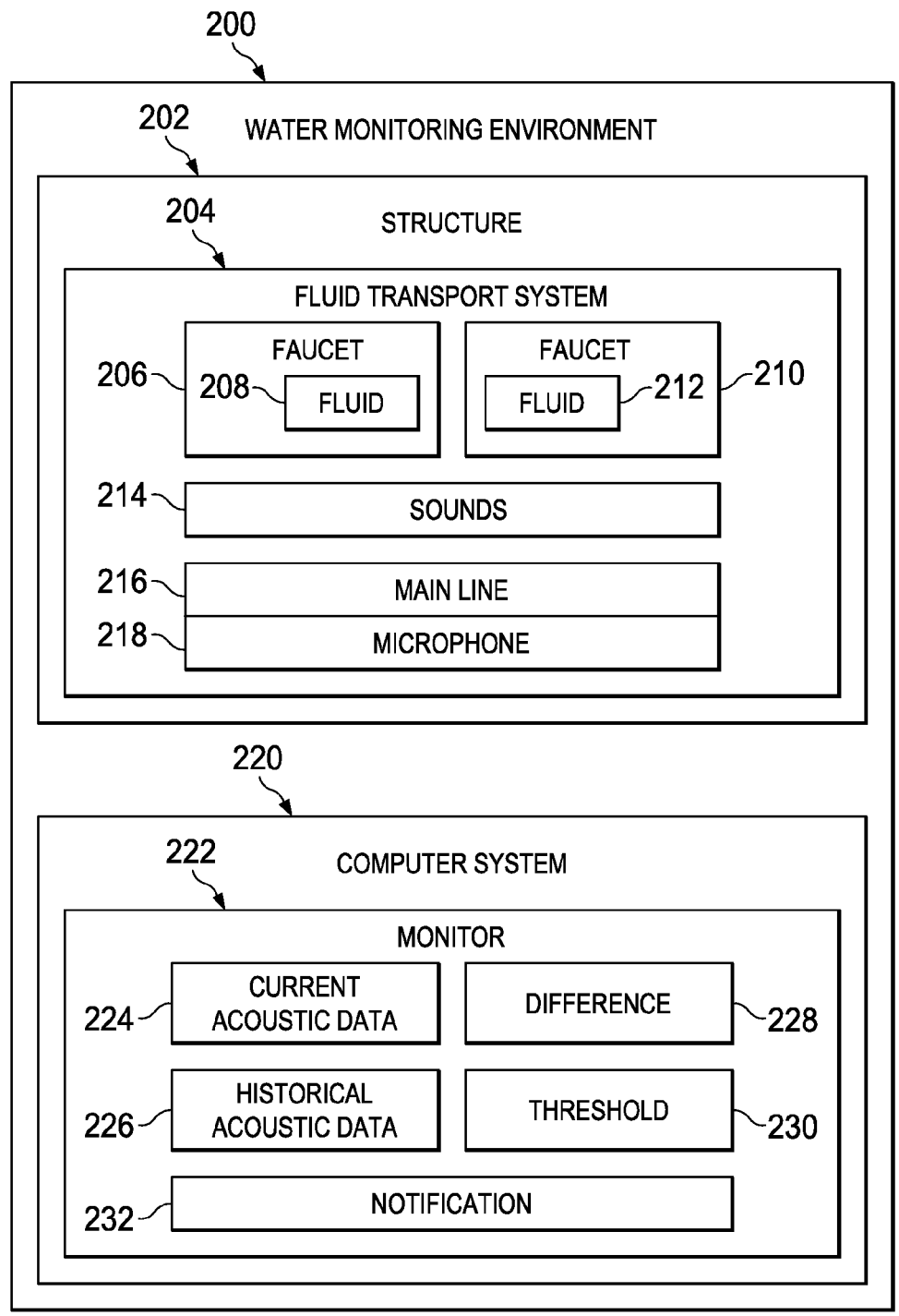
FIG. 2 is an illustration of a water monitoring environment in which illustrative embodiments may be implemented.

With reference now to FIG. 2, an illustration of water monitoring environment 200 is depicted in accordance with an illustrative embodiment. Water monitoring environment 200 is an example of water monitoring environment 200 of FIG. 1. Structure 202 is an example of structure 102 of FIG. 1. Fluid transport system 204 is an example of fluid transport system 104 of FIG. 1. Faucet 206 and fluid 208 are examples of endpoint 106 and fluid 108 of FIG. 1, respectively. Furthermore, faucet 210 and fluid 212 are examples of endpoint 106 and fluid 108 of FIG. 1, respectively.

In the depicted example, structure 202 comprises fluid transport system 204. In the depicted example, fluid transport system 104 comprises faucet 206, faucet 210, sounds 214, and main line 216. In the depicted example, sounds 214 are generated by fluid 208 flowing at faucet 206 and fluid 212 flowing at faucet 210.

Main line 216 is an example of set of locations 112 of FIG. 1. Sounds 110 can be monitored and detected at main line 216. In this illustrative example, main line 216 is a portion of fluid transport system 204. Main line 216 can transport fluids to structure 202 or transport fluids away from structure 202. Main line 216 can be one or more fluid lines that transport fluids. In this illustrative example, microphone 218 is in contact with main line 216 or in a vicinity close enough to main line 216 to allow microphone 216 to monitor and detect sounds 214 at set main line 216. In some illustrative examples, microphone 216 may be one or more devices that monitor and detect sounds 214 at one or more locations along main line 216. In some illustrative examples, one or more microphones may be located at one or more locations along fluid transport system 204 and within the vicinity of fluid transport system 204 that are different locations than main line 216.

Computer system 220 is an example of computer system 116 of FIG. 1. In this illustrative example, computer system 220 comprises monitor 222. Monitor 222 is an example of monitor 118 of FIG. 1. In this illustrative example, monitor 222 receives current acoustic data 224 associated with main line 216. In this illustrative example, current acoustic data 120 is generated by monitoring sounds 214 at main line 216. Monitor 118 receives data generated by microphone 218 monitoring main line 216.

Computer system 220 also includes historical acoustic data 226, which is acoustic data generated by monitoring sounds at main line 216 at one or more time periods before monitoring sounds 214 for current acoustic data 224. For example, historical acoustic data 226 can be data that indicates faucet 206 is operating properly and is consuming an amount of fluid within a threshold value. Historical acoustic data 226 can also indicate faucet 210 is operating properly and is consuming an amount of fluid within a threshold value. In some illustrative examples, current acoustic data 224 is compared with historical acoustic data 226 to form difference 228. Difference 228 can be one or more numerical values or any other value suitable for indicating one or more variations between current acoustic data 224 and historical acoustic data 226.

Responsive to determining that difference 228 exceeds threshold 230, monitor 222 performs an action. As in FIG. 1, threshold 230 is one or more numerical values or any other value suitable for comparing to difference 228. In some illustrative examples, responsive to one or more values in difference 228 exceeding one or more values in threshold 230, monitor 222 performs an action. In some illustrative examples, for each end point, monitor 222 determines whether one or more values in difference 228 associated with the end point exceed one or more corresponding values in threshold 230 associated with the end point. For each end point in which one or more values in difference 228 associated with the end point exceed one or more corresponding values in threshold 230 associated with the end point, monitor performs an action. For example, monitor 222 may reduce a supply of fluid, such as water, to faucet 206, to faucet 210, or to both faucet 206 and faucet 210.

In some illustrative examples, monitor 222 may generate notification 232 in response to determining that one or more values in difference 228 exceeds one or more values in threshold 230. For example, notification 232 may indicate water consumption. In some illustrative examples, notification 232 indicates leaking water and water wastage. Notification 232 may include additional information, such as identification of an endpoint in which one or more values in threshold 230 associated with the end point exceed one or more corresponding values in difference 228 associated with the end point.

The illustration of water monitoring environment 100 in FIG. 1 and water monitoring environment 200 in FIG. 2 is not meant to imply physical or architectural limitations to the manner in which an advantageous embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, computer system 116 and database 130 may be located within structure 102. Computer system 116 may be remotely located. For example, computer system 116 and database 130 may be located in a different structure than structure 102. Computer system 116 and database 130 may be located in a mobile device or any other environment suitable for containing computer system 116 and database 130. Furthermore, endpoint 106, set of locations 112, and sensor system 114 may be located outside of structure 102 or partially outside of structure 102. Water monitoring environment 100 may include multiple structures and portions of one or more structures, wherein each structure includes a separate fluid transport system 104. In some illustrative examples, fluid transport system 104 may be located within multiple structures. Furthermore, structure 102 may include multiple fluid transport systems.

With reference now to FIG. 3, an illustration of a flowchart of a process for monitoring water consumption is depicted in accordance with an illustrative embodiment. The process illustrated in FIG. 3 may be implemented in a water monitoring environment, such as water monitoring environment 100 in FIG. 1 and water monitoring environment 200 in FIG. 2.

The process begins by monitoring a set of locations in a fluid transport system 104 in a structure 102 for sounds 110 generated by a fluid 108 flowing at an endpoint 106 of the fluid transport system 104 (step 302). The process generates current acoustic data 120 for the sounds 110 detected from monitoring a set of locations 112 (step 304). The process compares the current acoustic data 120 with historical acoustic data 122 to form a difference 124 (step 306). The process determines whether a difference 124 exceeds a threshold 126 (step 308). Responsive to determining that the difference 124 exceeds a threshold 126, the process performs an action 128 (step 310). Responsive to determining that the difference 124 does not exceed a threshold 126, the process terminates.

With reference now to FIG. 4, an illustration of a flowchart of a process for monitoring water consumption is depicted in accordance with an illustrative embodiment. The process illustrated in FIG. 4 may be implemented in a water monitoring environment, such as water monitoring environment 200 in FIG. 2.

The process begins by comparing the current acoustic data 224 with historical acoustic data 226 for an endpoint to form a difference 228 (step 402). The process determines whether the difference 228 exceeds a threshold 230 associated with the endpoint (step 404). Responsive to determining that the difference 228 exceeds the threshold 230, the process generates a notification 232 indicating water consumption at the endpoint (step 406). The process then reduces a supply of water to the endpoint (step 408). Thereafter, the process terminates. Returning to step 404, responsive to determining that the difference 228 does not exceed the threshold 230, the process terminates.

Figure 5:
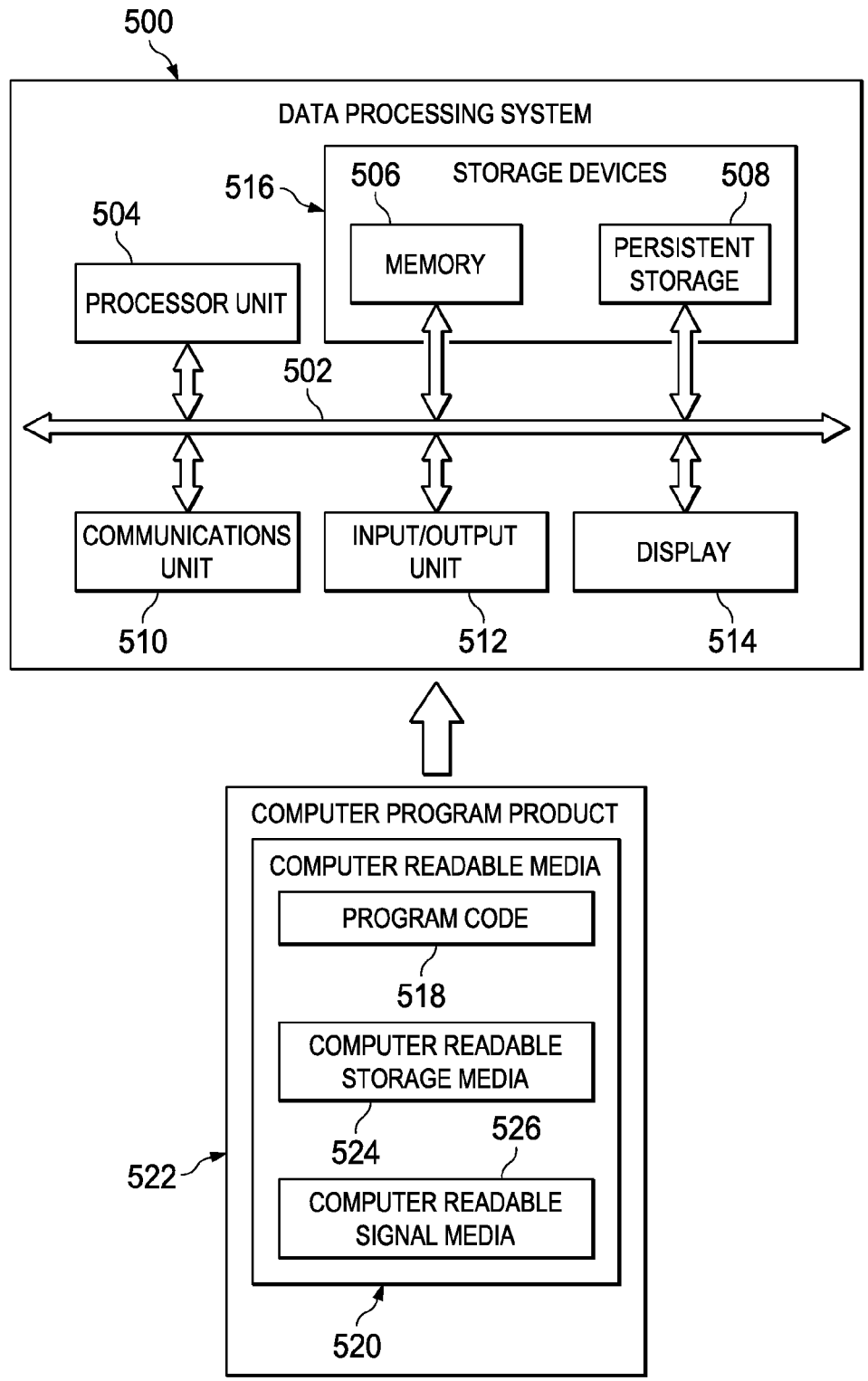
FIG. 5 is an illustration of a data processing system in accordance with an illustrative embodiment.

Turning now to FIG. 5, an illustration of a data processing system is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514. Data processing system 500 is an example of one implementation for computer system 116 in FIG. 1 and computer system 220 in FIG. 2.

Processor unit 504 serves to run instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 608 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 or run by processor unit 504. The processes of the different embodiments may be performed by processor unit 504 using computer implemented instructions, which may be located in a memory, such as memory 506.

These instructions are referred to as program code, computer usable program code, or computer readable program code that may be read and run by a processor in processor unit 504. The program code in the different embodiments may be embodied on different physical or computer readable storage media, such as memory 506 or persistent storage 508.

Program code 518 is located in a functional form on computer readable media 420 that is selectively removable and may be loaded onto or transferred to data processing system 500 and run by processor unit 504. Program code 518 and computer readable media 520 form computer program product 522 in these examples. In one example, computer readable media 520 may be computer readable storage media 524 or computer readable signal media 526. Computer readable storage media 524 may include storage devices, such as, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage device, such as a hard drive, a thumb drive, or a flash memory, that is connected to data processing system 500. In some instances, computer readable storage media 524 may not be removable from data processing system 500. In these illustrative examples, computer readable storage media 524 is a non-transitory computer readable storage medium.

Alternatively, program code 518 may be transferred to data processing system 200 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

Program code 518 may be downloaded over a network from a remote data processing system to computer readable storage media 524 in data processing system 500. Furthermore, data processing system 500 may be a server data processing system, and program code 518 may be downloaded over the network to the remote data processing system for use in another computer readable storage media in the remote data processing system.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 402.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the invention is a method, data processing system, and computer program product for monitoring water consumption. A set of locations in a fluid transport system in a structure is monitored for sounds generated by a fluid flowing at an endpoint of the fluid transport system. Current acoustic data is generated for the sounds detected from monitoring the set of locations. The current acoustic data is compared with historical acoustic data to form a difference. A determination is made as to whether the difference exceeds a threshold. An action is performed in response to determining that the difference exceeds the threshold.

One or more of the illustrative embodiments monitor water consumption by monitoring a set of locations in a fluid transport system for sounds generated by fluid flowing at an endpoint. By comparing current acoustic data with historic acoustic data, actions can be taken to prevent or reduce water consumption. The illustrative embodiments may provide an effective process for monitoring water usage. These results may save time and money because areas of excessive water consumption can be identified quickly. Furthermore, the environmental impact due to excessive water consumption may be reduced.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for monitoring water consumption, the method comprising:
   monitoring a set of locations in a fluid transport system in a structure for sounds generated by a fluid flowing at an endpoint of the fluid transport system;
   generating current acoustic data for the sounds detected from monitoring the set of locations;
   comparing, by a processor, the current acoustic data with historical acoustic data to form a difference, wherein the historic acoustic data was previously generated from detected sounds from monitoring the set of locations at a time period before generating the current acoustic data;
   determining, by the processor, whether the difference exceeds a threshold; and
   responsive to determining that the difference exceeds the threshold, performing an action initiated by the processor.

2. The method of claim 1, wherein:
   the historical acoustic data is collected specific to a specified building.

3. The method of claim 1, wherein the fluid transport system comprises a set of fluid lines for transporting fluid.

4. The method of claim 1, wherein the endpoint comprises at least one of a faucet, urinal, and toilet.

5. The method of claim 1, wherein the set of locations comprises a main line of the fluid transport system.

6. The method of claim 1, wherein the sounds are detected by one of a microphone, hydrophone, and acoustical transducer, and performing the action comprises generating a notification of the water consumption.

7. The method of claim 6, wherein the notification indicates leaking water or water wastage at the endpoint.

8. The method of claim 1, wherein performing the action comprises:
   reducing a supply of water to the endpoint.

9. The method of claim 1, further comprising:
   sending the current acoustic data to a monitor, which collects and stores the current acoustic data in a database.

10. The method of claim 1, wherein the difference indicates an abnormally long flush cycle of a toilet or urinal.

11. The method of claim 1, wherein the historic acoustic data comprises an acoustic signature of the endpoint.

12. The method of claim 11, wherein the historic acoustic data is determined during a setup phase where an acoustic signature for each of a plurality of endpoints of the fluid transport system is generated and catalogued in a database.

13. The method of claim 12, further comprising:
   storing the current acoustic data in the database along with a time of occurrence and duration of the current acoustic data.

14. The method of claim 13, wherein an identifier of the endpoint associated with the current acoustic data is also stored in the database.

* * * * *